United States Patent
Majkowski

(10) Patent No.: US 10,063,953 B1
(45) Date of Patent: Aug. 28, 2018

(54) INTEGRATED SPEAKER AND LIGHT

(71) Applicant: FORD GLOBAL TECHNOLOGIES, LLC, Dearborn, MI (US)

(72) Inventor: Matthew Anthony Majkowski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/428,301

(22) Filed: Feb. 9, 2017

(51) Int. Cl.
| | |
|---|---|
| *H04B 1/00* | (2006.01) |
| *H04R 1/02* | (2006.01) |
| *H04R 17/00* | (2006.01) |
| *H04R 7/06* | (2006.01) |
| *H04R 3/00* | (2006.01) |
| *F21V 9/16* | (2006.01) |
| *F21V 23/04* | (2006.01) |
| *B60Q 3/217* | (2017.01) |
| *F21V 3/04* | (2018.01) |
| *F21V 3/06* | (2018.01) |
| *F21V 9/30* | (2018.01) |
| *F21Y 113/13* | (2016.01) |
| *F21Y 115/10* | (2016.01) |

(52) U.S. Cl.
CPC ............ *H04R 1/028* (2013.01); *B60Q 3/217* (2017.02); *F21V 3/0418* (2013.01); *F21V 3/061* (2018.02); *F21V 9/16* (2013.01); *F21V 9/30* (2018.02); *F21V 23/0485* (2013.01); *H04R 1/025* (2013.01); *H04R 3/00* (2013.01); *H04R 7/06* (2013.01); *H04R 17/00* (2013.01); *F21Y 2113/13* (2016.08); *F21Y 2115/10* (2016.08); *H04R 2307/023* (2013.01); *H04R 2499/13* (2013.01)

(58) Field of Classification Search
CPC .......... H04R 1/028; H04R 1/025; H04R 3/00; H04R 7/06; H04R 17/00; H04R 2307/023; H04R 2499/13; B60Q 3/217; F21V 3/0418; F21V 9/16; F21V 23/0485; F21Y 2115/10; F21Y 2113/13
See application file for complete search history.

(56) References Cited

U.S. PATENT DOCUMENTS

| | | | |
|---|---|---|---|
| 7,536,211 B2 | 5/2009 | Saiki et al. | |
| 8,068,635 B2 | 11/2011 | Carlson et al. | |
| 9,351,083 B2 | 5/2016 | Hecht et al. | |
| 9,464,803 B2 * | 10/2016 | Salter | B60Q 3/85 |

(Continued)

FOREIGN PATENT DOCUMENTS

| | | |
|---|---|---|
| CN | 201726529 U | 1/2011 |
| CN | 203289639 U | 11/2013 |

(Continued)

OTHER PUBLICATIONS

English Machine Translation of CN201726529U.

(Continued)

*Primary Examiner* — Andrew L Sniezek
(74) *Attorney, Agent, or Firm* — Vichit Chea; King & Schickli, PLLC

(57) ABSTRACT

An integrated speaker and lamp assembly includes a speaker diaphragm and a light source directing light through the speaker diaphragm. A related method of integrating a speaker and a lamp is also disclosed.

12 Claims, 3 Drawing Sheets

(56) References Cited

U.S. PATENT DOCUMENTS

| | | | | |
|---|---|---|---|---|
| 2007/0003100 | A1* | 1/2007 | Liu | H04R 1/028 381/412 |
| 2015/0041683 | A1* | 2/2015 | Horner | G02F 2/02 250/474.1 |
| 2016/0286318 | A1* | 9/2016 | Yuasa | F21V 33/0056 |
| 2017/0245079 | A1* | 8/2017 | Sheen | H04R 29/007 |

FOREIGN PATENT DOCUMENTS

| | | |
|---|---|---|
| JP | 2006013779 A | 1/2006 |
| JP | 3792130 B2 | 7/2006 |

OTHER PUBLICATIONS

English Machine Translation of CN203289639U.
English Machine Translation of JP2006013779A.
English Machine Translation of JP3792130B2.

\* cited by examiner

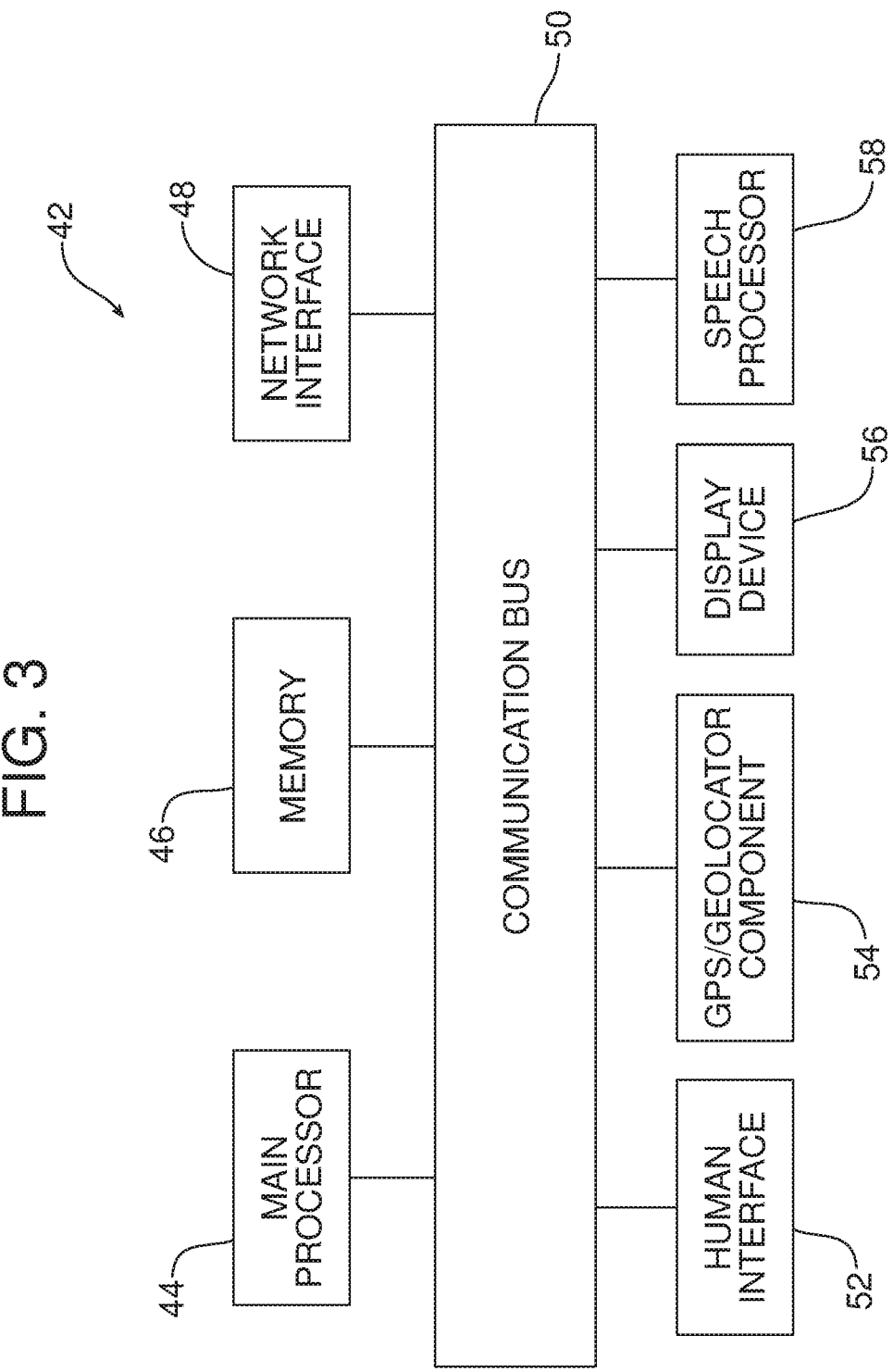

INTEGRATED SPEAKER AND LIGHT

TECHNICAL FIELD

This document relates generally to the audio and lighting fields and, more particularly, to an integrated speaker and lamp that may be utilized for a number of purposes and is particularly suitable for motor vehicle applications.

BACKGROUND

There is a limited amount of packaging space in motor vehicle applications. Additional component counts lead to additional cost and assembly and packaging complexity. This is particularly true in the center stack of the motor vehicle where multiple modules are required to share limited space. The same is true for the doors of the motor vehicle where retractable windows, window regulator modules, locking systems, audio speakers and lighting systems compete for very limited packaging space. Significantly, the limited space available on the center stack and doors of a motor vehicle significantly limits total styling options as only so much surface area is available.

This document relates to a new and improved integrated speaker and lamp assembly that is useful for a number of purposes and particularly useful for motor vehicle applications. The integrated speaker and lamp assembly is relatively inexpensive to produce, as well as being compact and lightweight. Advantageously, it provides a dual lighting and sound generating function. By providing dual functionality in a limited space, the integrated speaker and lamp assembly eases packaging constraints thereby enhancing options for packaging and styling of a center stack, motor vehicle door or along other trim panels of a motor vehicle.

SUMMARY

In accordance with the purposes and benefits described herein, a new and improved integrated speaker and lamp assembly is provided. That integrated speaker and lamp assembly comprises a speaker diaphragm and a light source directing light through the speaker diaphragm.

The speaker diaphragm may be transparent or optically clear. In some of the many possible embodiments of the integrated speaker and lamp assembly, a photoluminescent layer may be provided on a first face of the speaker diaphragm.

The integrated speaker and lamp assembly may further include a printed circuit board. The light source may be carried on that printed circuit board. Alternatively, or in addition, the actuator for driving the speaker diaphragm and producing desired sounds may be provided on that printed circuit board. Where both the light source and the actuator for the speaker diaphragm are provided on a single printed circuit board, assembly and manufacturing costs are reduced and a more compact assembly is provided resulting in further space savings.

In some of the many possible embodiments of the integrated speaker and lamp assembly, the light source is a blue LED and the photoluminescent layer is a rylene dye.

The integrated speaker and lamp assembly may also include an integrated switch to control the light source. That integrated switch may include a sensor layer bonded to a second face of the speaker diaphragm.

In accordance with yet another aspect, a method is provided of integrating a speaker and a lamp into a single assembly. That method comprises directing a light source through a speaker diaphragm.

The method may further include the step of providing a photoluminescent layer on a first face of the speaker diaphragm. In addition, the method may include bonding a sensor layer to a second face of the speaker diaphragm. That sensor layer may be configured to switch the light source between an activated state, wherein the light source provides illumination to the motor vehicle, and a deactivated state in response to alternate touches of the speaker diaphragm.

The method may also include the step of using a transparent or optically clear speaker diaphragm. Further, the method may include using a blue LED for the light source. In addition, the method may include using a rylene dye for the photoluminescent layer and directing light from the blue LED through the transparent speaker diaphragm onto the rylene dye. This results in the production of a white light being emitted into the interior passenger compartment of the motor vehicle from the transparent speaker diaphragm.

The method may further include mounting the speaker diaphragm on a trim panel of a motor vehicle.

More specifically, the method may include mounting the speaker diaphragm on a door panel, a center stack or a console of the motor vehicle.

In the following description, there are shown and described several preferred embodiments of the integrated speaker and lamp assembly as well as the related method of integrating a speaker and a lamp. As it should be realized, the integrated speaker and lamp assembly and related method are capable of other, different embodiments and their several details are capable of modification in various, obvious aspects all without departing from the integrated speaker and lamp assembly and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the integrated speaker and lamp assembly and together with the description serve to explain certain principles thereof.

FIG. 3 is a schematic block diagram of a controller utilized to control operation of the integrated speaker and lamp assembly of FIG. 1.

Reference will now be made in detail to the present preferred embodiments of the integrated speaker and lamp assembly, examples of which are illustrated in the accompanying drawing figures.

DETAILED DESCRIPTION

Figure 1:
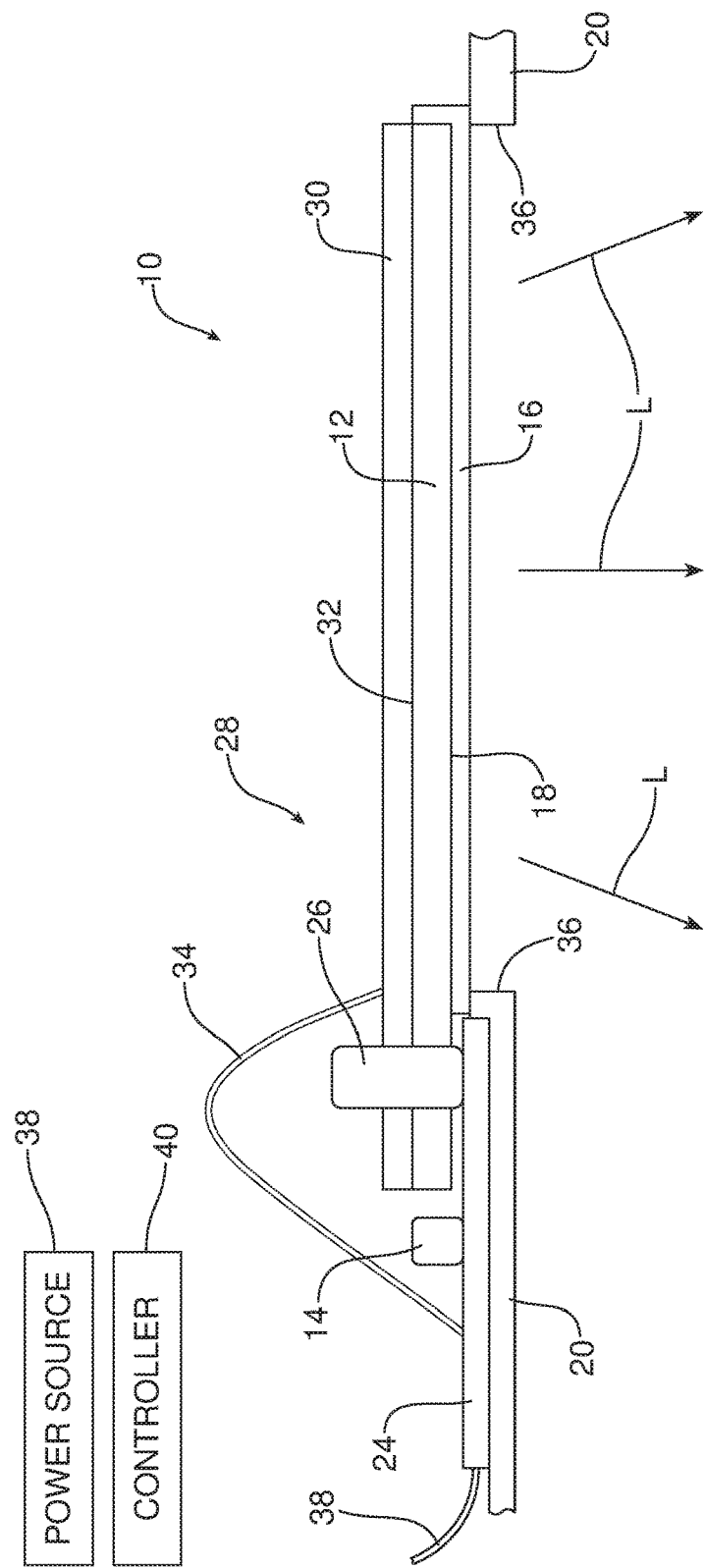
FIG. 1 is a schematic illustration of the integrated speaker and lamp assembly mounted in a trim panel of a center stack, center console or door of a motor vehicle.

Reference is now made to FIG. 1 which schematically illustrates the integrated speaker and lamp assembly 10. As illustrated, the integrated speaker and lamp assembly 10 includes a speaker diaphragm 12 and a light source 14 directing light through the speaker diaphragm. The speaker diaphragm 12 may be transparent. In one of many possible embodiments, the speaker diaphragm 12 may comprise a sheet of optically clear acrylic glass.

Figure 2:
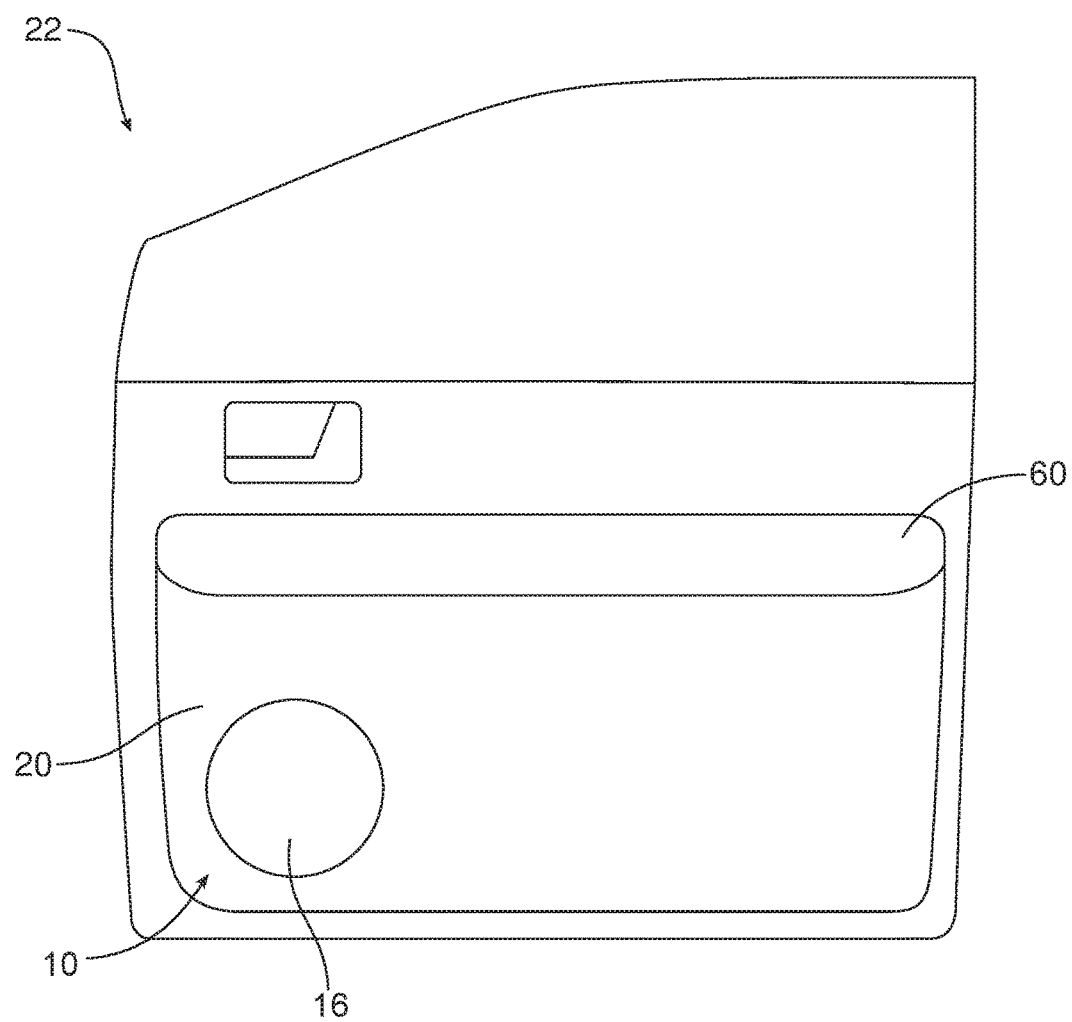
FIG. 2 is an illustration of a motor vehicle door incorporating the integrated speaker and lamp assembly of FIG. 1.

As illustrated in FIG. 3, a photoluminescent layer 16 may be provided on a first face 18 of the speaker diaphragm 12. In one of the many possible embodiments, the light source 14 is a blue LED and the photoluminescent layer 16 is a rylene dye. In such an embodiment, when the blue LED light source 14 is activated, the blue light emitted from the light source travels through the speaker diaphragm 12 in a manner similar to a light pipe exciting the rylene dye of the photoluminescent layer which emits a soft white light L into the interior of the motor vehicle from the trim panel 20 in which the integrated speaker and lamp assembly 10 is mounted. As should be appreciated, that trim panel 20 may be part of a motor vehicle door 22 as illustrated in FIG. 2, part of a center stack of the motor vehicle, part of the center console of the motor vehicle or part of substantially any other feature of the motor vehicle as desired by the vehicle designer.

As illustrated in FIG. 1, the integrated speaker and lamp assembly 10 may also include a printed circuit board 24. In the illustrated embodiment, the light source 14 is carried on the printed circuit board 24.

In addition, the integrated speaker and lamp assembly 10 includes an actuator 26 for driving the speaker diaphragm 12 and producing desired sounds. Where the speaker diaphragm 12 is a sheet of acrylic glass, that actuator 26 may comprise a piezoelectric actuator that stimulates the side of the speaker diaphragm 12 to produce efficient motion and thereby generate desired sound. In the illustrated embodiment, both the light source 14 and the actuator 26 are carried on the same printed circuit board 24. The integration of the light source 14 and actuator 26 on the same printed circuit board 24 provides a number of benefits and advantages including reduction in production and assembly costs and results in space savings thereby providing enhanced options for packaging and styling. Fewer parts also mean less complexity.

As further illustrated in FIG. 1, the integrated speaker and lamp assembly 10 also includes an integrated switch 28 to control the light source. In the illustrated embodiment, the integrated switch 28 includes a sensor layer 30 bonded to the second face 32 of the speaker diaphragm 12 and a lead 34 connecting the sensor layer 30 to the printed circuit board 24. The integrated switch 28 is configured so that one simply touches the front of the speaker diaphragm 12 exposed by the opening 36 in the trim panel 20 to alternately activate and deactivate the light source 14.

The printed circuit board 24 may include a pigtail connector 38 for operatively connecting the printed circuit board 24 to, for example, a power source 40 and a controller 42 of the motor vehicle so that the printed circuit board receives power for operating the light source 14 and actuator 26. As illustrated in FIG. 3, the controller 42 may comprise a computing device in the form of a dedicated microprocessor or an electronic control unit (ECU) operating in accordance with instructions received from appropriate control software. Such a controller 42 includes one or more processors 44, one or more memories 46 and one or more network interfaces 48 all in communication with each other over a communication bus 50. In some embodiments, the controller 42 may comprise a body control module or BCM. A BCM controller 42 may also include a human interface 52, a GPS/geolocator component 54, a display device such as a multi-function display with touchscreen capability 56 and a speech processor 58 to provide voice command capability. As illustrated, the human interface 52, the GPS/geolocator component 54, the display device 56 and the speech processor 58 may also communicate with each other over the communication bus 50 with the main processor 44, the memory 46 and the network interface 48.

A BCM controller 42 may perform a number of interior body electrically based functions including, for example, interior locking, remote key entry, interior lighting, exterior lighting, windshield wiper control and the like. In some embodiments, a BCM controller 42 may also function to control entertainment functions (e.g. radio, CD player) and communications such as telephone and Internet communications over a wireless network. In some embodiments, the BCM controller 42 is connected by a communication bus (not shown) to other control modules that provide one or more of these additional functions.

The controller 42 is configured to provide additional functionality to the integrated speaker and lamp assembly 10. For example, the controller 42 may activate the light source 14 upon the opening of a motor vehicle door 22, upon voice command or in accordance with other software instruction. Similarly, the controller 42 may deactivate the light source 14 when all doors of the motor vehicle are closed, upon voice command or in the event of any other event per software instructions. Here it should be appreciated that the touchscreen display device 56 may be utilized by the motor vehicle operator to program the operation of the controller 42 and the light source 14 through that controller depending upon first preference. Voice commands through the speech processor 58 could be used for the same purpose.

Consistent with the above description, a method is provided of integrating a speaker and a lamp into an integrated speaker and lamp assembly 10. That method may be broadly described as comprising directing light L from a light source 14 through a speaker diaphragm 12.

In some of the many possible embodiments, the method may also include the step of providing a photoluminescent layer 16 on a first face 18 of the speaker diaphragm 12. Further, the method may include the step of bonding a sensor layer 30 to a second face 32 of the speaker diaphragm 12. That sensor layer 30 may be of a capacitive type that reacts to the touching of the speaker diaphragm 12. Further, the sensor layer 30 may be configured to switch the light source 14 between an activated state and a deactivated state in response to alternate touches of the speaker diaphragm 12. Thus, when the speaker diaphragm 12 is touched for a first time, the light source 14 is turned on. When the speaker diaphragm 12 is touched for a second time, the light source 14 is turned off.

The method may further include the step of using a transparent speaker diaphragm such as an optically clear acrylic material. Further, the method may include using a blue LED for the light source 14 as well as using a rylene dye for the photoluminescent layer 16. In addition, the method may include directing light from the blue LED light source 14 through the transparent speaker diaphragm 12 onto the photoluminescent layer 16 of rylene dye, exciting that rylene dye to emit a soft white glow.

Still further, it should be appreciated that the method may include the step of mounting the integrated speaker and lamp assembly 10 including the speaker diaphragm 12 on a trim panel 20 of a motor vehicle. As illustrated in FIG. 2, that trim panel 20 may comprise part of a door 22 of a motor vehicle. As illustrated in FIG. 2, the integrated speaker and lamp assembly 10 and the speaker diaphragm 12 thereof is mounted on the trim panel 20 adjacent a lower left corner of the door 22 below the arm rest 60. It should be appreciated that this mounting location is merely illustrative in nature and that other mounting locations for the integrated speaker and lamp assembly 10 are envisioned. These include other places on the door 22 as well as on other trim panels 20 throughout the motor vehicle including, but not necessarily limited to the center stack and center console of the motor vehicle.

In summary, the integrated speaker and lamp assembly 10 and the related method of integrating a speaker and lamp into a single assembly provide a number of benefits and advantages. The integrated speaker and lamp assembly 10 utilizes less total area of interior surface space to provide both lighting and sound functions. The integrated speaker and lamp assembly 10 has few total parts and is less complex. Touch inputs provided through the speaker diaphragm 12 allow one to easily activate and deactivate the light source 14 as desired. The integrated speaker and lamp assembly 10 is lightweight and compact with the latter feature enhancing options for packaging and styling of the motor vehicle.

The foregoing has been presented for purposes of illustration and description. It is not intended to be exhaustive or to limit the embodiments to the precise form disclosed. Obvious modifications and variations are possible in light of the above teachings. For example, the controller 42 for the integrated speaker and lamp assembly 10 could be included on the circuit board 24. As a further example, the light source 14 of the illustrated embodiment is identified as a blue LED. The light source could be a different color or even multiple LEDs of differing colors that excite the photoluminescent layer 16 to produce different color light effects. All such modifications and variations are within the scope of the appended claims when interpreted in accordance with the breadth to which they are fairly, legally and equitably entitled.

What is claimed is:

1. An integrated speaker and lamp assembly, comprising:
    a speaker diaphragm;
    a light source of the lamp assembly directing light through said speaker diaphragm;
    an integrated switch to control said light source, wherein said integrated switch includes a sensor layer bonded to a first face of said speaker diaphragm;
    a printed circuit board wherein said light source is carried on said printed circuit board; and
    an actuator carried on said printed circuit board for driving said speaker diaphragm.

2. The integrated speaker and lamp assembly of claim 1, wherein said speaker diaphragm is transparent.

3. The integrated speaker and lamp assembly of claim 2, including a photoluminescent layer on a second face of said speaker diaphragm.

4. The integrated speaker and lamp assembly of claim 3, wherein said light source is a blue LED and said photoluminescent layer is a rylene dye.

5. A method of integrating a speaker and a lamp including a light source, comprising:
    providing a photoluminescent layer on a first face of a speaker diaphragm;
    bonding a sensor layer to a second face of said speaker diaphragm;
    configuring said sensor layer to switch all the light source between an activated state and a deactivated state in response to touching said speaker diaphragm; and
    directing light from said light source through said speaker diaphragm.

6. The method of claim 5, including using a transparent speaker diaphragm.

7. The method of claim 6, including using a blue LED for said light source.

8. The method of claim 7, including using a rylene dye for said photoluminescent layer and directing light through said transparent speaker diaphragm onto said rylene dye.

9. The method of claim 8, including mounting said speaker diaphragm on a trim panel of a motor vehicle.

10. The method of claim 8, including mounting said speaker diaphragm on a door panel of a motor vehicle.

11. The method of claim 8, including mounting said speaker diaphragm on a center stack or console of a motor vehicle.

12. An integrated speaker and lamp assembly, comprising:
    a speaker diaphragm;
    a light source of the lamp assembly directing light through said speaker diaphragm;
    an integrated switch to control said light source, wherein said integrated switch includes a sensor layer bonded to a face of said speaker diaphragm.

* * * * *

UNITED STATES PATENT AND TRADEMARK OFFICE
CERTIFICATE OF CORRECTION

PATENT NO. : 10,063,953 B1  
APPLICATION NO. : 15/428301  
DATED : August 28, 2018  
INVENTOR(S) : Matthew Anthony Majkowski Page 1 of 1

It is certified that error appears in the above-identified patent and that said Letters Patent is hereby corrected as shown below:

In the Claims

Column 6, Line 17, Claim 5, please replace "switch all the" with ---switch the---.

Signed and Sealed this  
Thirtieth Day of October, 2018

Andrei Iancu  
*Director of the United States Patent and Trademark Office*